April 30, 1935. W. G. HAGMAIER ET AL 1,999,607
DEFIBERIZER
Filed Feb. 21, 1930 4 Sheets-Sheet 1

Inventors
W. G. Hagmaier
E. C. Shaw
by G. J. DeWein
Attorney

April 30, 1935. W. G. HAGMAIER ET AL 1,999,607
DEFIBERIZER
Filed Feb. 21, 1930 4 Sheets-Sheet 2

Inventors
W. G. Hagmaier
E. C. Shaw
by
Attorney

April 30, 1935.  W. G. HAGMAIER ET AL  1,999,607
DEFIBERIZER
Filed Feb. 21, 1930   4 Sheets-Sheet 4
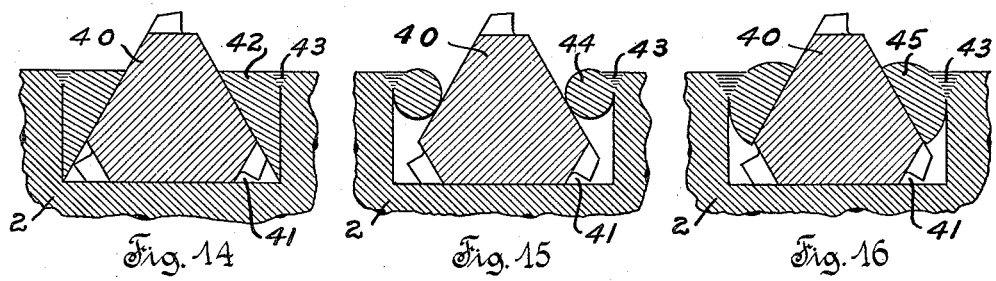
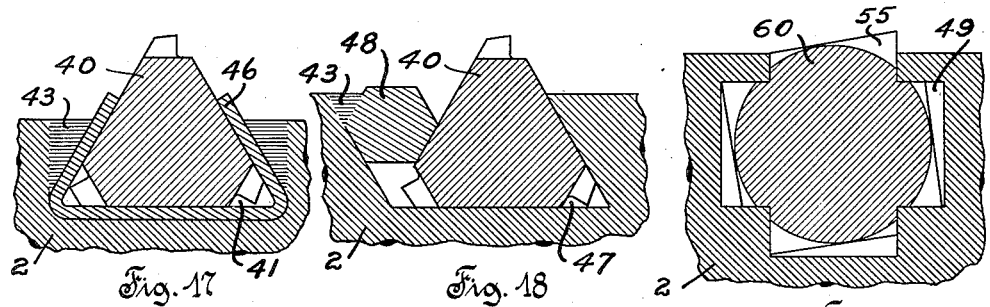
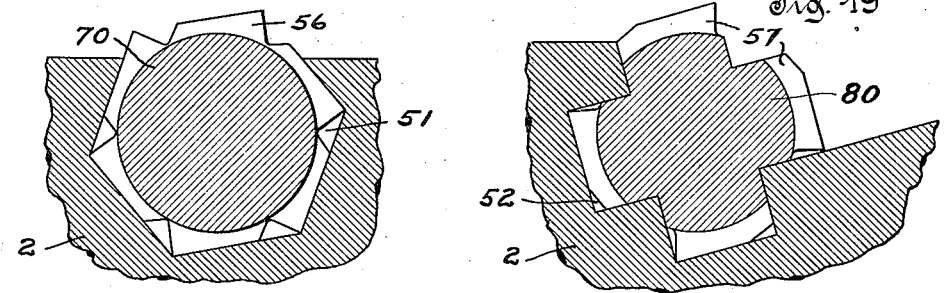
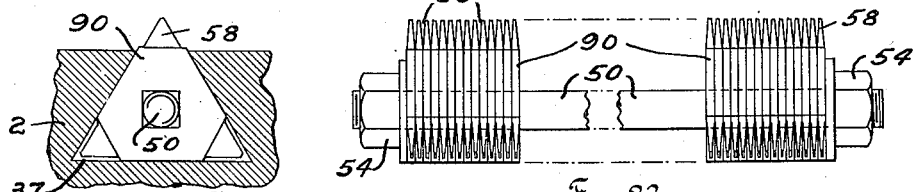
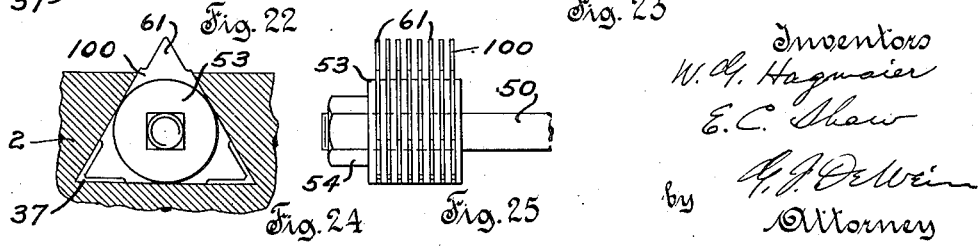
Inventors
W. G. Hagmaier
E. C. Shaw
by G. J. DeWein
Attorney Patented Apr. 30, 1935

1,999,607

UNITED STATES PATENT OFFICE 1,999,607

DEFIBERIZER

William G. Hagmaier, West Allis, and Ernest C. Shaw, Milwaukee, Wis., assignors to Allis-Chalmers Manufacturing Company, Milwaukee, Wis., a corporation of Delaware Application February 21, 1930, Serial No. 430,213

5 Claims. (Cl. 83—75)

This invention relates in general to improvements in the art of treating fibrous materials, and relates more specifically to improvements in the construction and operation of rotary machines for defiberizing wood, bark or the like for pulp making purposes.

A general object of the invention is to provide an improved defiberizer which is simple, compact and durable in construction, and which is operable with minimum expenditure of power to produce maximum output.

It has heretofore been proposed to defiberize wood or bark for paper making purposes, by subjecting logs or slabs to the yielding combing action of a multiplicity of resilient wire needles pivotally associated with a rotor revolving at high speed, the wood being fed tangentially across the rotor longitudinally of the grain or fiber. This prior method of defiberizing while producing desirable product, has proven objectionable since it is difficult to secure a rotor structure of sufficient durability to resist distortion and destruction of the needles when subjected to continuous operation for a reasonable period of time.

It has also been proposed to utilize a rotor structure comprising a series of ordinary circular saws mounted upon an arbor, in place of the needle type rotor above described. While the saw type of rotor is considerably more durable, it is also extremely costly and it requires complete dismantling of the rotor in order to sharpen the saw teeth. With such a rotor structure, it is necessary to so dismantle the rotor at intervals so as to maintain uniform product and desirably large capacity of fiber production, this operation necessitating expenditure of considerable time and labor.

It is a more specific object of the present invention to provide a defiberizing machine of the rotor type, which will substantially eliminate all of the defects of these prior types of machines. The present improvement contemplates provision of means for effecting convenient removal and replacement of the defiberizing elements. The invention furthermore contemplates provision of improved raking elements which will effectively defiberize material which could not be readily treated by the prior machines. Another specific object of the invention is to provide improved mechanism for permitting convenient variation in the quality as well as the quantity of fiber produced, and means for readily maintaining the defiberizing elements in most effective condition. The invention further contemplates provision of improved means for feeding the fibrous material to the disintegrating mechanism. These and other objects of the present invention will be apparent from the following description.

A clear conception of several embodiments of the various features of the present invention and of the mode of constructing and of manipulating machines built in accordance therewith, may be had by referring to the drawings accompanying and forming a part of this specification in which like reference characters designate the same or similar parts in the various views.

Fig. 14 is a section through a fragment of the rotor showing a modified mounting of the defiberizing element shown in Figs. 12 and 13.

Fig. 15 is a section through a fragment of the rotor showing another form of mounting for the defiberizing element shown in Figs. 12 and 13.

Fig. 16 is a sectional view through a fragment of the rotor showing a further modification of the mounting of the defiberizing element shown in Figs. 12 and 13.

Fig. 17 is a sectional view through a fragment of the rotor showing still another modified form of mounting for the defiberizing element of Figs. 12 and 13.

Fig. 18 is a sectional view through a fragment of the rotor showing a further modified form of mounting for the defiberizing element of Figs. 12 and 13.

Fig. 19 is a section through a fragment of the rotor and through another form of defiberizing element.

Fig. 20 is a section through a fragment of the rotor and through still another form of defiberizing element.

Fig. 21 is a section through a fragment of the rotor and showing an additional form of defiberizing element.

Fig. 22 is a section through a fragment of the rotor showing a defiberizing element built up of individual plate sections.

Fig. 23 is a fragmentary side view of the defiberizing element shown in Fig. 22.

Fig. 24 is a section through a fragment of the rotor showing another form of defiberizing element built up of individual plate sections with intervening spacers.

Fig. 25 is a fragmentary side view of the defiberizing element shown in Fig. 24.

While the invention will be described herein as being specifically applied to a machine wherein a single rotor is utilized to perform the defiberizing operation, it should be understood that the novel features are more generally applicable to machines having several rotors revolvable either in the same or in opposite directions.

Figure 1:
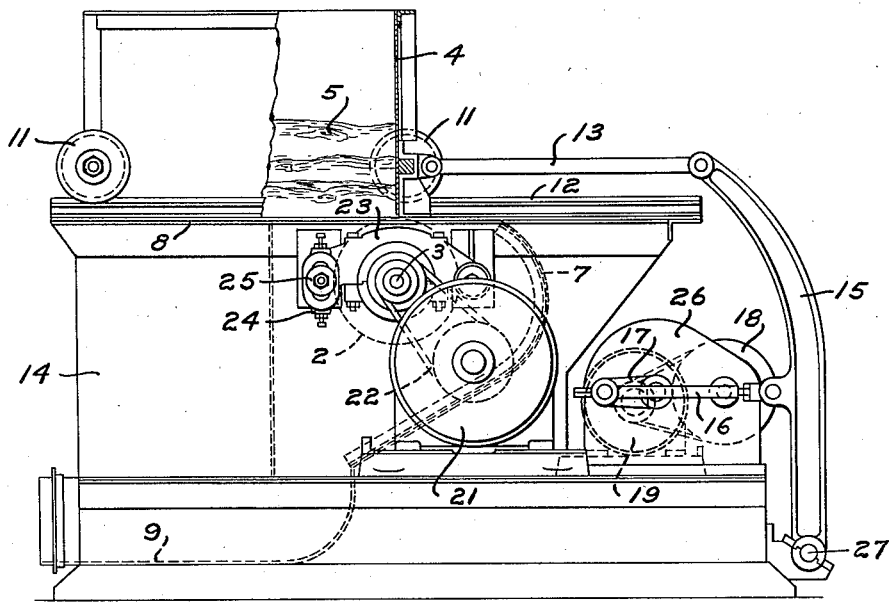
Fig. 1 is a part sectional side elevation of an improved single rotor defiberizing machine.
Figure 2:
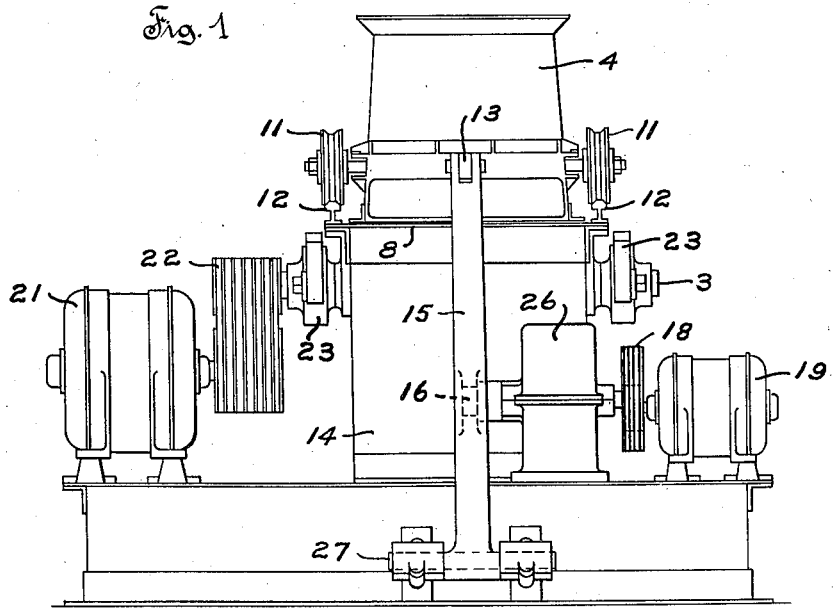
Fig. 2 is an end elevation of the defiberizing machine illustrated in Fig. 1.
Figure 4:
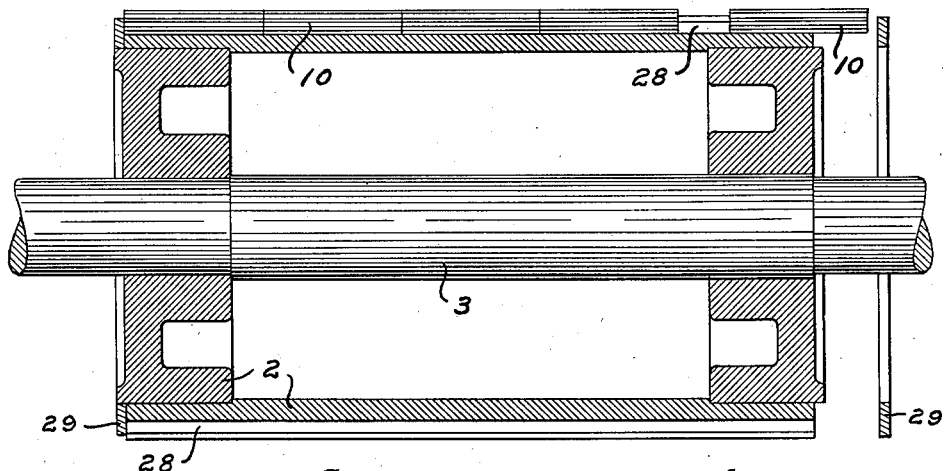
Fig. 4 is an enlarged longitudinal section through one of the improved rotors of the defiberizing machine.
Figure 5:
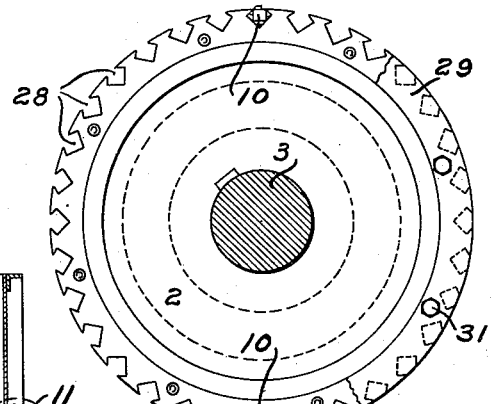
Fig. 5 is an end view of the rotor, with all but two of the defiberizing elements removed.
Figure 3:
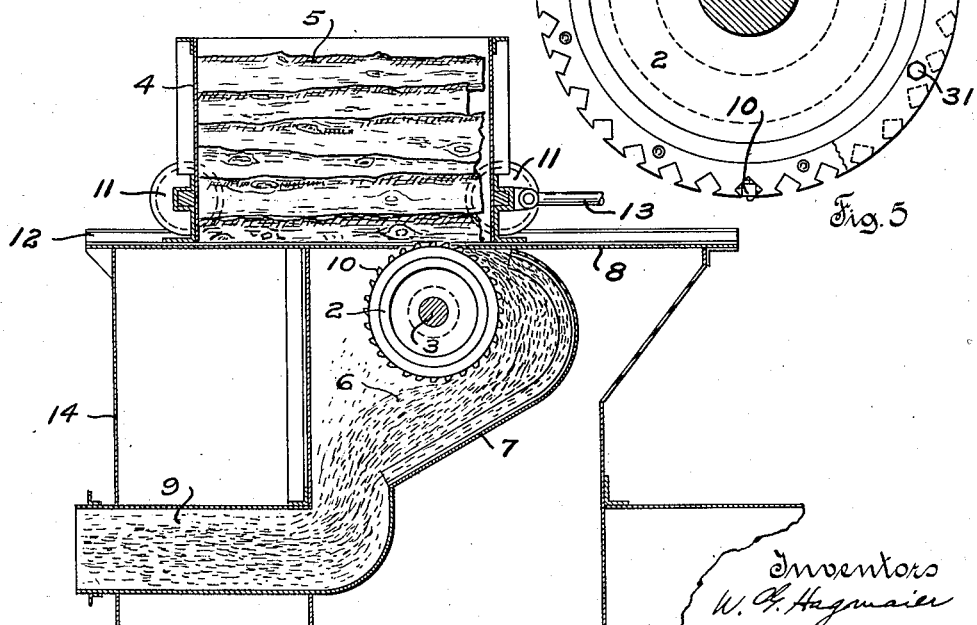
Fig. 3 is a fragmentary sectional view of the single rotor defiberizing machine of Figs. 1 and 2.

Referring specifically to Figs. 1, 2 and 3 of the drawings, the improved defiberizer comprises in general a rotor 2 secured to a shaft 3 rotatably mounted in adjustable bearings 23 attached to a main frame 14, and a reciprocable hopper or carriage 4 movable tangentially across the rotor 2. The rotor 2 and the shaft 3 are rotatable at high speed in a clockwise direction as viewed in Figs. 1 and 3, by means of an electric motor 21 which is drivingly connected to an end of the shaft 3 by means of a multiple V-belt drive 22. The rotor periphery may be provided with an annular series of equally spaced V-grooves 28 extending from end to end of the rotor 2 and disposed substantially parallel to the axis of the shaft 3, the grooves 28 being formed to receive defiberizing elements 10 having rigid teeth 32 which project outwardly beyond the rotor periphery thus providing an annular series of teeth revolvable with the rotor. The defiberizing elements 10 may be formed as a single bar or in short sections, and are endwise removable from the recesses 28 upon removal of one of the retaining rings 29 which are normally held in place by cap screws 31 so as to hold the elements 10 snugly within the rotor grooves 28. The teeth of the rotor 2 are carried, as the rotor revolves, through an opening in the top plate 8 which is secured to the top of the main frame 14 between the rotor 2 and the feed carriage 4, see Fig. 3. The rotor bearings 23 are vertically adjustable by means of adjusting screws 24 cooperating with a fixed bearing support 25, to vary the degree of projection of the teeth beyond the top of the plate 8.

The carriage 4 has supporting wheels 11 coacting with rails 12 which rest upon the top plate 8, and is provided with outwardly and downwardly sloping side walls as shown in Fig. 2, so that the slabs or logs 5 admitted to the carriage chamber will gravitate freely toward the plate 8. As the carriage 4 is moved back and forth, the logs 5 therein are dragged or slid longitudinally through the path of travel of the defiberizing teeth 32, thereby permitting the rapidly moving teeth to gradually remove the fiber 6 and to deliver the same beneath the plate 8. The portion of the rotor 2 beneath the plate 8, is housed within a lower chamber formed by confining plates 7 which connect the opposite sides of the frame 14, and the fiber 6 is automatically removed as produced, from this lower chamber by suction induced by a fan or the like connected to the discharge conduit 9.

The carriage 4 is constantly reciprocable by means of an oscillatory arm 15 the lower end of which is supported upon a pivot 27 mounted on the frame 14, and the upper end of which is connected with the carriage 4 by means of one or more actuating rods 13. The medial portion of the arm 15 is connected with a crank 17 by means of a link 16, the crank being rotatable at a predetermined speed by means of an electric motor 19 which operates the crank 17 at greatly reduced speed by virtue of the intervening multiple V-belt drive 18 and reduction gearing housed within a casing 26.

While the defiberizing elements carried by the rotor 2 may assume a number of different shapes and forms, it is desirable in all cases to have the teeth of these elements rigid with respect to the rotor. It is also desirable to have these teeth tapered on their opposite sides so as to provide V-shaped grooves between the successive teeth, whereby fibrous material and slivers will not tend to lodge between the teeth and thereby reduce the effectiveness of the teeth for defiberizing purposes. The teeth of the defiberizing elements should also be formed to permit convenient sharpening thereof by merely passing a grinding surface across the forward faces of the sets.

Figure 6:
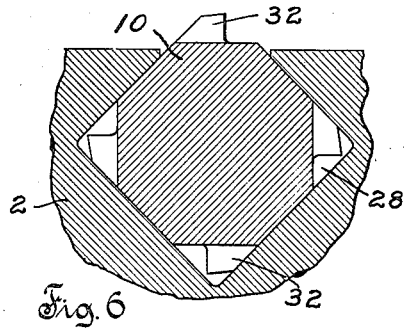
Fig. 6 is a further enlarged sectional view through a fragment of the rotor and through one of the defiberizing elements.
Figure 7:
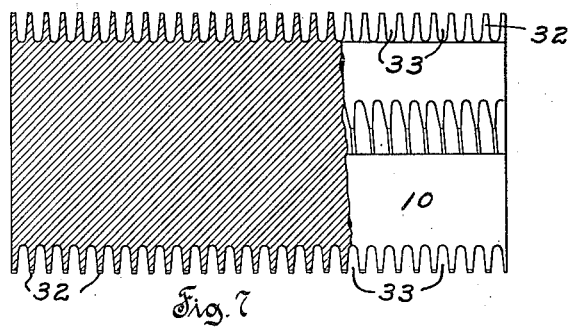
Fig. 7 is a part sectional side view of the defiberizing elements disclosed in Fig. 6.

In Figs. 6 and 7 is shown a type of defiberizing element 10 comprising a longitudinal series of sections each formed of a piece of standard bar stock having square cross section, the four corners of the bar stock having been notched to form the teeth 32 and intervening V-shaped recesses 33. The rotor 2 is grooved to snugly embrace the sections of each element 10, and the teeth 32 may be disposed either in planes perpendicular to the axis of the bar stock, or spirally relative to said axis as shown in Fig. 7. Each of the elements 10 has four sets or rows of teeth 32, which may be interchangeably caused to project beyond the rotor periphery, as a preceding set of teeth becomes dull. Removal of the elements 10 may be readily effected by merely removing one of the end rings 29, and these elements will fit the grooves 28 in four different positions.

Figure 8:
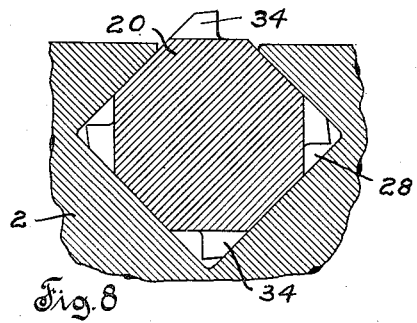
Fig. 8 is a sectional view through a fragment of the rotor and through a modified form of defiberizing element.
Figure 9:
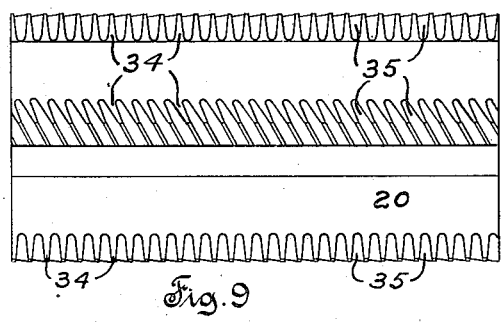
Fig. 9 is a side elevation of the defiberizing element shown in Fig. 8.

In Figs. 8 and 9 is shown a modified type of defiberizing element 20 comprising a longitudinal series of sections each formed of a piece of standard bar stock having square cross section, the four corners of the bar stock having been notched to form teeth 34 and intervening V-shaped recesses 35. The teeth 34 are disposed at a considerable angle relative to the axis of the bar stock, so as to present a substantially rectilineal crest when viewed perpendicular to the axis of the stock. The modified defiberizing elements 20 will fit snugly in grooves 28 of the same form used in connection with the elements 10, and the elements 20 may be used in a rotor which is also provided with some elements 10 wherein the teeth 33 lie in planes substantially perpendicular to the axis of the bar stock. As in the case of the elements 10, the elements 20 likewise have four sets or rows of teeth 34, which may be interchangeably caused to project beyond the rotor periphery; and these elements 20 are also readily removable from the rotor 2.

Figure 10:
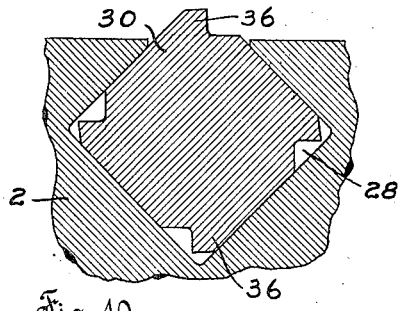
Fig. 10 is a sectional view through a fragment of the rotor showing still another form of defiberizing element.
Figure 11:
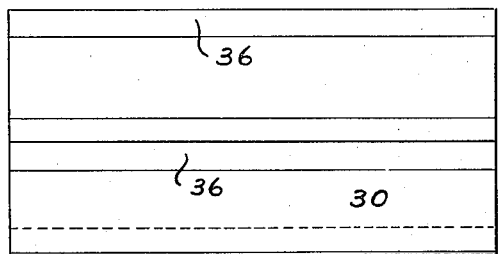
Fig. 11 is a side view of the defiberizing element shown in Fig. 10.

In Figs. 10 and 11 is shown a further modified type of defiberizing element 30 comprising a longitudinal series of sections each formed of a piece of standard bar stock having square cross section and a single continuous tooth 36 at each corner extending the full length of the section, each tooth 36 presenting a continuous rectilineal crest similar to the element shown in Figs. 8 and 9. The solid toothed elements 30 are intended for use in conjunction with elements 10, 20 having sets of individual teeth. The elements 30 may be inserted in oppositely disposed grooves of a rotor 2 adapted to cooperate with toothed elements 10, 20, and serve to periodically iron out the corrugations in the wood 5, produced by the sets of small teeth, so as to permit the subsequently approaching small teeth to more effectively remove the fiber 6. The elements 30 are adapted to snugly fit the grooves 28 of the rotor 2 and are endwise removable from these grooves as in the preceding cases.

Figure 12:
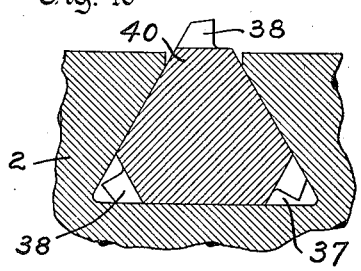
Fig. 12 is a section through a fragment of the rotor and through still another modified form of defiberizing element.
Figure 13:
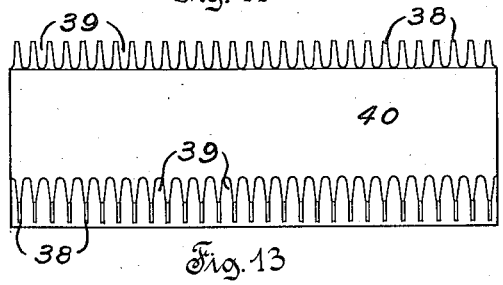
Fig. 13 is a side view of the defiberizing element shown in Fig. 12.

In Figs. 12 and 13 is shown a type of defiberizing element 40 comprising a longitudinal series of sections each formed of a piece of standard bar stock having triangular cross section, the three corners of the bar stock having been notched to form the teeth 38 and intervening V-shaped recesses 39. The rotor 2 when intended for use in conjunction with triangular elements 40, is provided with triangular or V-shaped grooves 37 within which the elements 40 are adapted to snugly fit, and the rows of teeth 38 of the elements 40 may be interchangeably caused to project beyond the rotor periphery, in order to present new cutting teeth as preceding sets of teeth become dull. Removal of the elements 40 may be readily effected as hereinbefore described.

In Figs. 14, 15, 16, 17 and 18 are shown various groove formations for receiving the triangular defiberizing elements 40. In Fig. 14 the rotor is first provided with rectangular grooves 41 within each of which a set of triangular strips or filler blocks 42 are subsequently secured by means of welds 43. The grooves 41 may thus be readily formed by a milling operation, and when the filler blocks 42 have been secured in place, a V-groove is formed which will snugly fit and effectively retain the elements 40. These elements are however freely endwise removable from the grooves 41 as previously described. In Fig. 15 the rotor is again provided with rectangular grooves 41, and circular filler blocks 44 are secured within the grooves 41 by welds 43 in order to provide retaining grooves cooperable with the triangular defiberizing elements. In Fig. 16 the filler blocks 45 are formed of semi-circular cross section, whereas in Fig. 17 a sheet metal liner 46 is welded within each groove 41, the liner being again formed to snugly fit the triangular defiberizing elements 40, as shown. In Fig. 18 the grooves 47 have inclined side walls and hexagonal filler blocks 48 are secured within these grooves by welds 43 so as to retain the triangular defiberizing elements 40 within the grooves 47 as shown.

In Figs. 19, 20 and 21 are shown still further modified forms of defiberizing element and groove structures. As shown in Fig. 19, the defiberizing element 60 is formed of bar stock having square cross section, which is notched longitudinally at each corner after which sets of teeth 55 are formed thereon by turning the stock in a lathe. The grooves 49 in the rotor 2 are formed by milling rectangular slots in the rotor and by subsequently broaching lateral recesses at the opposite sides of the milled slot. In Fig. 20 the defiberizing elements 70 are formed of bar stock having hexagonal cross section, the stock being longitudinally notched at the corners and subsequently turned in a lathe to form the teeth 56. The rotor 2 is provided with five-sided grooves 51 to snugly fit the elements 70. In Fig. 21 the defiberizing elements 80 are formed of bar stock having square cross section which is notched at the corners and subsequently turned in a lathe to form teeth 57. The rotor 2 is provided with grooves 52 each formed by milling cross slots at different angles. It will be apparent that other rotor groove and defiberizing element structures may be utilized in order to facilitate construction of these parts, and that the various types of defiberizing elements thus far described, may be formed either of one or several sections of suitable length.

In Figs. 22 and 23 is shown a type of defiberizing element formed of sections each comprising a triangular plate 90 having a single tooth 58 at each corner thereof. The plates 90 are mounted upon a clamping bar 50 and are clamped directly against each other by means of nuts 54 coacting with the bar 50. The teeth 58 are formed with inclined sides so as to produce intervening V-grooves 59. The entire group of plates 90 is thus simultaneously insertible within and removable from a recess 37 in the rotor 2, and the individual plates 90 may be stamped from sheet steel and subsesuently distorted to form the teeth.

In the type of defiberizing element shown in Figs. 24 and 25, each element is again formed of triangular plates 100 each having a tooth 61 at each corner thereof. The plates 100 are formed of sheet metal of uniform thickness throughout and are assembled upon a clamping bar 50 with spacing washers 53 disposed between the successive plates, the plates and washers being clamped upon the bar 50 by means of clamping nuts 54. As in the case of the element shown in Figs. 22 and 23, the element of Figs. 24 and 25 is likewise insertible within the removable from grooves 37 in the rotor 2, in groups.

During normal operation of the defiberizer, the carriage 4 is reciprocated over the plate 8 by means of the oscillating arm 15, and the rotor 2 is revolved by means of the motor 21. Slabs, blocks or logs 5 are placed within the reciprocating carriage 4 and gravitate through the downwardly enlarging carriage chamber, toward the plate 8. The advancing teeth of the rapidly revolving rotor 2 successively remove fiber 6 from the bottoms of the logs 5, and this fiber is automatically removed as produced, from the lower chamber formed by the housing plates 7, through the discharge conduit 9, by means of a fan or the like. If it is desired to vary the quantity and the quality of the fiber 6, either the rotor 2 may be raised or lowered by manipulating the adjusting screws 24 of the bearings 23, or defiberizing elements having teeth of different characteristics may be applied to the rotor. If the effective teeth of the rotor 2 become dulled, the defiberizing elements may be removed endwise from the rotor grooves and re-inserted to present a new set of defiberizing teeth at each rotor groove.

When all sets of teeth of the defiberizing elements have become dulled, the teeth may be sharpened by a simple grinding operation. It will thus be noted that the invention provides an extremely durable and simple construction for producing fiber of any desired characteristics.

The use of rigid teeth of relatively small height, prevents objectionable slivers from jamming between the plate 8 and the periphery of the rotor 2 at the opening in the plate. The tapered formation of the recesses between the successive teeth, also prevents material from lodging in these spaces and thereby interfering with the effectiveness of the defiberizing teeth. The oscillating arm 15 and the mechanism for driving the same, provide simple means for reciprocating the carriage 4, and it has been found by actual operation of a machine built in accordance with the present invention, that the device will effectively defiberize irregular pieces of wood of relatively small dimensions, which could not be effectively treated in the prior art machines.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. A defiberizing apparatus for reducing masses of wood or like fibrous material to separated fiber particles useful for paper pulp making purposes, comprising a rotor having peripheral defiberizing teeth, a carriage movable tangentially across said rotor, said carriage having a material confining chamber of enlarging cross section approaching said rotor, and means for periodically moving said carriage across said rotor.

2. In a defiberizing apparatus for reducing a mass of fibrous material to separated fiber particles for pulp making purposes, a rotor, and a plurality of sectional elements carried by said rotor, each of said elements having a plurality of substantially uniform and integrally connected and longitudinally alined teeth projecting beyond the rotor periphery and the teeth of at least one of said elements presenting a substantially rectilineal crest of the same length as the rotor when viewed normal to the rotor axis.

3. A defiberizing apparatus for reducing a mass of wood or like fibrous material to separated fiber particles for pulp making purposes, comprising a rotor, and a plurality of toothed sectional elements detachably carried by said rotor, at least some of said sections being formed of polygonal bar stock and provided with three or more peripherally spaced sets of teeth, said latter sections being interchangeably disposable in operative position to cause different ones of said sets to project beyond the periphery of said rotor.

4. A defiberizing apparatus for reducing a mass of fibrous material, such as wood, to separate elongated fibers or fiber particles useful for pulp making purposes, having a rotor provided at its periphery with a plurality of circumferentially spaced defiberizing elements, and means for feeding wood or like fibrous material tangentially of the path of travel of the said defiberizing elements during the rotation thereof, characterized in that, certain of said defiberizing elements are arranged in series of longitudinally alined and spaced defiberizing teeth or cutting members, and other defiberizing elements are provided which are circumferentially spaced from and interspersed among said first mentioned series of defiberizing elements, the defiberizing elements of the second mentioned group having cutting edges elongated in the general direction of the axis of the rotor and being adapted to remove from said fibrous material fiber particles remaining between the paths of adjacent defiberizing teeth or cutting members of said first mentioned group of defiberizing elements.

5. A defiberizing apparatus according to claim 4, wherein the defiberizing elements having elongated cutting edges present a substantially continuous cutting edge throughout a major portion of the length of said element in the direction of the rotor axis.

WILLIAM G. HAGMAIER.
ERNEST C. SHAW.